United States Patent [19]
Termerinac et al.

[11] Patent Number: 5,881,107
[45] Date of Patent: Mar. 9, 1999

[54] TRANSMISSION SYSTEM FOR DIGITAL SIGNALS, AND TRANSMITTER AND RECEIVER THEREFOR

[75] Inventors: Miodrag Termerinac, Hartheim; Franz-Otto Witte, Emmendingen, both of Germany

[73] Assignee: Deutsche ITT Industries, GmbH, Freiburg, Germany

[21] Appl. No.: 814,551

[22] Filed: Mar. 11, 1997

[30] Foreign Application Priority Data

Mar. 11, 1996 [EP] European Pat. Off. ............. 96103816
Apr. 24, 1996 [EP] European Pat. Off. ............. 96106396

[51] Int. Cl.$^6$ .......................... H04L 27/10; H04L 27/18; H04L 23/02; H04L 5/12
[52] U.S. Cl. ...................... 375/279; 375/279; 375/259; 375/260; 375/261; 375/298; 329/304; 329/308; 332/103
[58] Field of Search .................................... 375/279, 261, 375/259, 298, 260; 370/204, 203, 206; 329/304, 308; 332/103, 104

[56] References Cited

U.S. PATENT DOCUMENTS

| | | |
|---|---|---|
| 4,528,526 | 7/1985 | McBiles . |
| 4,546,322 | 10/1985 | Crutcher ..................................... 329/50 |
| 4,759,039 | 7/1988 | Debus, Jr. et al. ....................... 357/39 |
| 5,369,378 | 11/1994 | Kosaka et al. ............................ 332/104 |
| 5,473,280 | 12/1995 | Ohnishi et al. ......................... 329/304 |
| 5,491,457 | 2/1996 | Feher ....................................... 332/103 |

FOREIGN PATENT DOCUMENTS

| | | |
|---|---|---|
| 0263687 | 4/1988 | European Pat. Off. . |
| 0660321 | 6/1995 | European Pat. Off. . |
| WO8603356 | 6/1986 | WIPO . |

OTHER PUBLICATIONS

IEEE transactions on Communications, pp. 275–283, vol. Com–30 (1982) Jan., No. 1, New York, USA.
Patent Abstracts of Japan, vol. 006, No. 160 (E–126), 21 Aug. 1982 & JP–A–57 079725 (Victor Co of Japan Ltd.), 19 May 1982.
European Patent Office Search Report 5 May 1996.
European Patent Office Search Report 19 Sep. 1996.

*Primary Examiner*—Stephen Chin
*Assistant Examiner*—Michael W. Maddox
*Attorney, Agent, or Firm*—Plevy & Associates

[57] ABSTRACT

Transmission system with a transmitter (T), a receiver (R), and a filter combination (FI1, FI2; FQ1, FQ2) for transmitting a digital signal (sr), encoded in symbols (Si), from the transmitter (T) to the receiver (R) at any frequency position by quadrature modulation, wherein one of the two quadrature signal components (ki, kq) in the transmitter is delayed before the quadrature modulation by a time interval td, particularly by td=Tsymb/4. (FIG. 7)

10 Claims, 7 Drawing Sheets

| Bitpaar | | I | Q | Si |
| d1 | d2 | | | |
|---|---|---|---|---|
| 0 | 0 | −1 | −1 | 0 = S0 |
| 0 | 1 | −1 | 1 | 1 = S1 |
| 1 | 0 | 1 | −1 | 2 = S2 |
| 1 | 1 | 1 | 1 | 3 = S3 |

TRANSMISSION SYSTEM FOR DIGITAL SIGNALS, AND TRANSMITTER AND RECEIVER THEREFOR

The present invention relates to a transmission system for a digital signal which is encoded in symbols and is transmitted from a transmitter to a receiver at an arbitrary frequency position by quadrature modulation. The invention further relates to a transmitter, a receiver, and a filter combination for such a transmission system.

Transmission systems for digital signals have been known for a long time and, because of their advantageous properties, are increasingly also being used for the transmission or storage of signals or data in entertainment or information systems. The main characteristic of such systems is that the information to be transmitted is present serially as a digitized or coded signal, and that prior to its transmission or storage, this digital signal is generally subjected to a QPSK modulation (=Quaternary Phase-Shift Keying). This is, as a rule, followed by a frequency conversion for the transmission channel or the radio-frequency transmission band; if the signals are stored, this conversion is not necessary. At the receiver end, signal processing is performed in reverse order, whereby the original digital signal is recovered. This is followed by the further signal processing in the receiver, which, however, is not of interest here. The transmitted signal, which passes through the transmission channel, is a continuous analog signal which contains the digital information in some coded form as modulation. An essential requirement is the presence of reliable quantization ranges during this modulation, so that the highest possible noise immunity is achieved. The above-mentioned QPSK modulation technique and its variations combine high transmission reliability and high adaptability. The signals to be transmitted may range from narrow-band measuring or sound signals to broadband video or high-resolution color television signals. Some examples of known terrestrial or satellite-based transmission systems using this technique are: DVB=Digital Video Broadcasting, DAB=Digital Audio Broadcasting, ADR=Astra Radio, and World Space Radio. Further known forms of quadrature modulation include: BPSK=Binary Phase-Shift Keying, QAM=Quadrature Amplitude Modulation, and VSB=Vestigial Sideband Modulation.

Quadrature modulation can be described as a vector which rotates at the carrier frequency in an imaginary plane that is formed by an I coordinate and a Q coordinate perpendicular thereto. Without modulation, the rotational frequency is constant, so that the phase constantly increases. This defines a reference phase which is modulated with the signal to be transmitted. In the case of analog signals, any phase value is possible. In the case of digital signals, quantization is performed, through which only particular phase ranges are permissible and, thus, distinguishable, such as the four quadrants. Disturbances which remain smaller than the respective quantization limits have no effect. By specifying the carrier frequency, the QPSK modulation technique can be adapted to the frequency range to be transmitted. Under certain circumstances, e.g., in the QAM technique, the vector length is also changed, whereby independent further information can be transmitted.

In developing a transmission system, optimization of the overall system with regard to its transmission properties and with regard to the cost and complexity of the transmitters and receivers to be used is necessary. In this connection it is important whether the system is bidirectional or whether it consists essentially of only one transmitter and a plurality of receivers, as in the case of an ordinary broadcasting system. In the latter case it is advisable to design the system asymmetrically, possible even with greater complexity for the transmitter, if the transmission properties can thus be improved and/or the receivers simplified.

It is, therefore, an object of the invention to provide a transmission system for digital signals by which an improvement in the transmission properties and particularly a reduction in the amount of circuitry required for the receiver can be achieved in comparison with conventional systems.

Another object is to provide a transmitter and a receiver for the transmission system according to the invention.

A further object is to provide an advantageous filter combination for the transmission system according to the invention.

The primary object of the invention is attained by delaying one of the two quadrature signal components in the transmitter before the quadrature mixing by a given time interval, particularly by one quarter of a symbol period. This time delay of one of the quadrature signal components with respect to the other has considerable effects, both on the amplitude stability of the quadrature modulation in the transmitter and on the circuit complexity of the receiver, which can be greatly simplified if implemented using digital circuitry. The amount of circuitry required for the transmitter remains approximately the same or increases only insignificantly, as will be shown below.

The simplification in the receiver results from the inventive recognition that if one of the two quadrature signal components is delayed in the transmitter by a given time interval, the pulse-shaping filter in the receiver can be replaced by a simple IIR structure with all-pass networks without any additional group delay equalization becoming necessary for either of the two quadrature signal components.

The invention and further advantageous features thereof will now be explained in more detail with reference to the accompanying drawings, in which.

Figure 1:
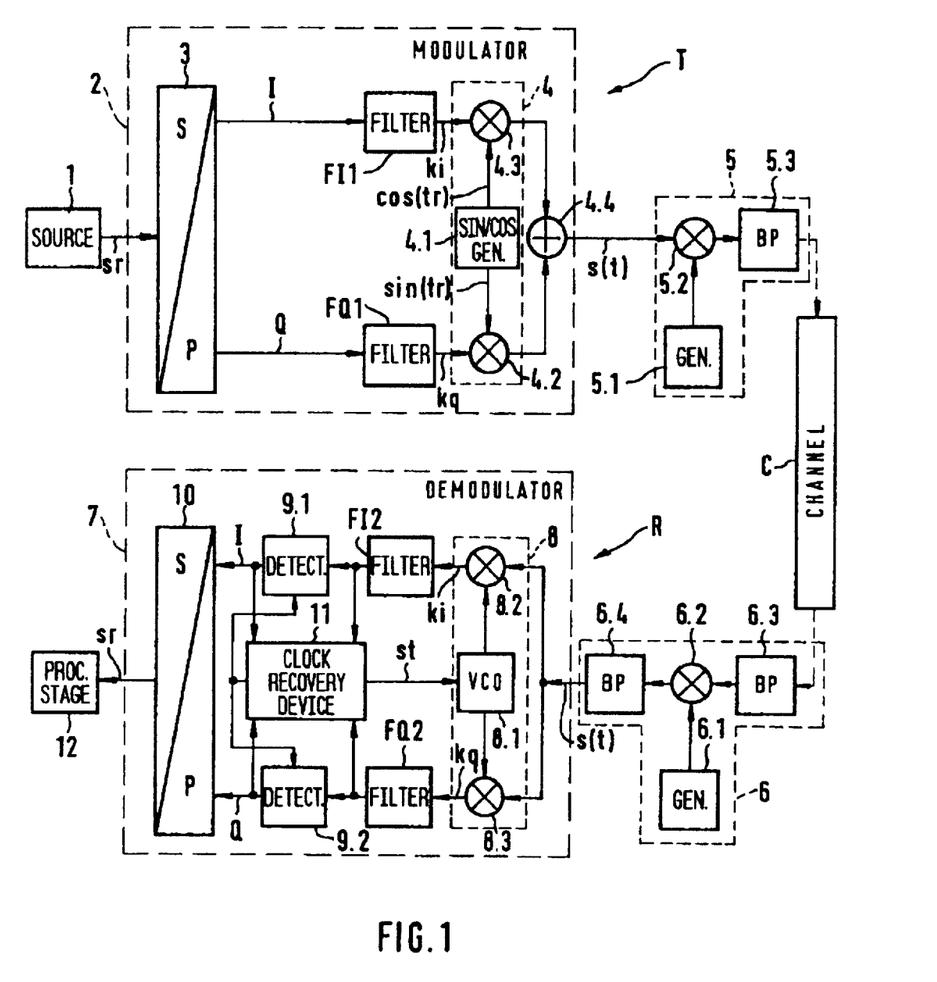
FIG. 1 is a block diagram of a conventional transmitter with associated receiver.

In FIG. 1, a digital data stream is fed as a digital signal sr from a source 1 to a transmitter T. The parts which are essential for quadrature modulation are contained in a modulator 2, which includes a serial-to-parallel converter 3 that converts the digital signal sr into an I signal and a parallel Q signal, both in the form of a data stream. For band limitation, each of the data streams I, Q is fed to a respective pulse-shaping filter FI1, FQ1. After these filters, the two data streams I and Q are commonly referred to as an in-phase component ki and a quadrature component kq, respectively, and modulate a quadrature carrier tr by means of a quadrature mixer 4. The carrier tr is formed by means of a sin/cos generator 4.1, whose cos and sin components cos(tr) and sin(tr) are fed to a first mixer 4.2 and a second mixer 4.3, respectively. The carrier tr rotates in the vector diagram (see FIG. 4) at the carrier frequency $f_{tr}$. The outputs of the two mixers 4.2, 4.3 are added by means of an adder 4.4 to form a modulated signal s(t), which is brought to the band position of the transmission channel C by means of a single- or multi-stage frequency converter 5. Of the converter 5, a generator 5.1, a mixer 5.2, and a bandpass filter 5.3 at the output end are shown. The modulated signal s(t) is a continuous, analog signal on which external and noise signals are superimposed on the transmission path C. As is well known, the spurious effects caused by interferences or noise are minimized if the transmitter T and the receiver R include pulse-shaping filters which satisfy both the noise-matching criterion and the Nyquist criterion.

The receiver R is functionally the mirror image of the transmitter T. By means of a frequency converter 6 which contains a generator 6.1, a mixer 6.2, and two bandpass filters 6.3, 6.4, the received radio-frequency signal is converted, again as an analog signal s(t), to a lower frequency band or baseband, where it can be demodulated and decoded in a demodulator 7 using either analog or digital circuitry.

In the demodulator 7, the analog signal s(t) is first split into its in-phase and quadrature components ki, kq by means of a quadrature mixer 8. This may be done by mixing the analog signal with a sin signal and a cos signal from a sin/cos generator 8.1. The quadrature mixing may also be effected purely digitally, in which case the digitized signal values are multiplied on each sampling clock pulse with a digital sin value and a digital cos value which are obtainable for each angular value from a stored sin/cos table or determinable by suitable computational techniques, for example. The mixers 8.2, 8.3 are particularly easy to implement in digital form if the generator 8.1 delivers the values +1, 0, −1, 0, +1, 0, . . . as quadrature carrier values at fixed sampling instants. In both cases, the generator 8.1 must be locked to the reference phase of the transmitter via a phase-locked loop (=PLL). The quadrature mixer 8 is followed by a respective pulse-shaping filter FI2, FQ2 in each signal path, and the pulse-shaping filters are followed by an in-phase detector 9.1 and a quadrature detector 9.2, respectively. Finally, the I and Q signals are recombined into a single data stream sr by means of a parallel-to-serial converter 10. Further processing takes place in a processing stage 12.

In the demodulator 7, a clock recovery device 11 forms part of the PLL. It converts the I and Q signals to a control signal st which locks the variable-frequency generator 8.1 (=VCO) in frequency and phase to the reference phase. In a digital demodulator, the clock recovery device 11 also provides the sampling clock fs, whose frequency is, as a rule, an integral multiple of the symbol frequency fsymb.

Figure 2:
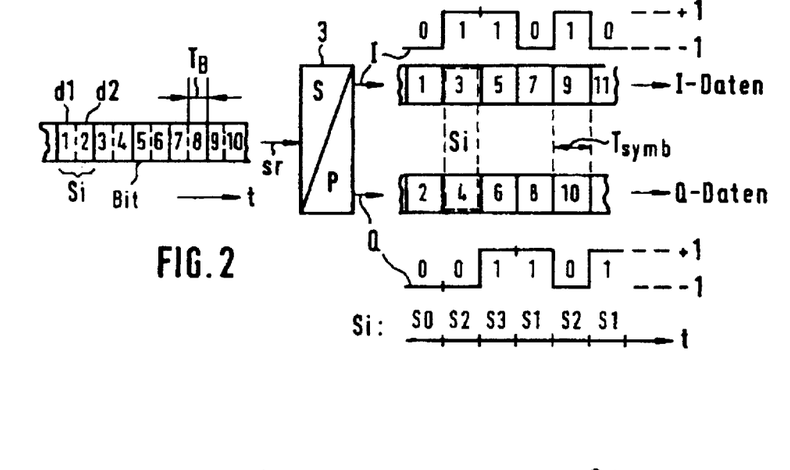
FIG. 2 illustrates the conversion of the data in the transmitter to parallel form.
Figure 3:
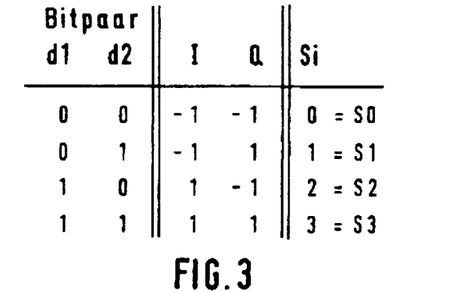
FIG. 3 shows a table for defining symbols.

In FIG. 2, the conversion of the original data stream sr to parallel form is illustrated by a data sequence. The serial-to-parallel converter 3 distributes the original bit sequence 1, 2, 3, 4, . . . alternately to two signal paths I, Q, so that the odd-numbered bits of the original bit pairs d1, d2 form an I data stream with the data rate $f_{Bit}/2$ while the even-numbered bit pairs form a Q data stream with the same data rate. The bit pair d1, d2 forms a "symbol" Si, which is encoded as such by the respective modulation process. A bit pair d1, d2 can have four different logic states, to which four different symbols S0, S1, S2, S3 are thus assigned, cf. the table of FIG. 3. The symbols Si recur at a symbol rate or symbol frequency fsymb which is only half the bit rate $f_{Bit}$ of the data stream sr. It is also possible to combine two or more original bits, e.g., four, six, or eight, into one symbol. Then, the possible number of symbols increases, while the symbol rate decreases. The lower the symbol rate, the lower the processing frequency in the transmitter and receiver and the frequency of the quadrature carrier can be.

Figure 4:
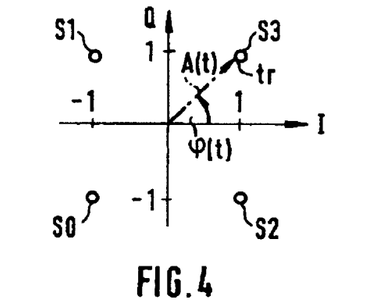
FIG. 4 shows a QPSK vector diagram.

FIG. 4 shows a vector diagram for a QPSK modulation. The four possible symbols Si are assigned the four quadrants of the unit circle. The vector corresponds to the carrier tr, whose instantaneous rotational position in the I/Q coordinate system is uniquely defined by the angle φ(t) and the amplitude A(t).

Figure 5:
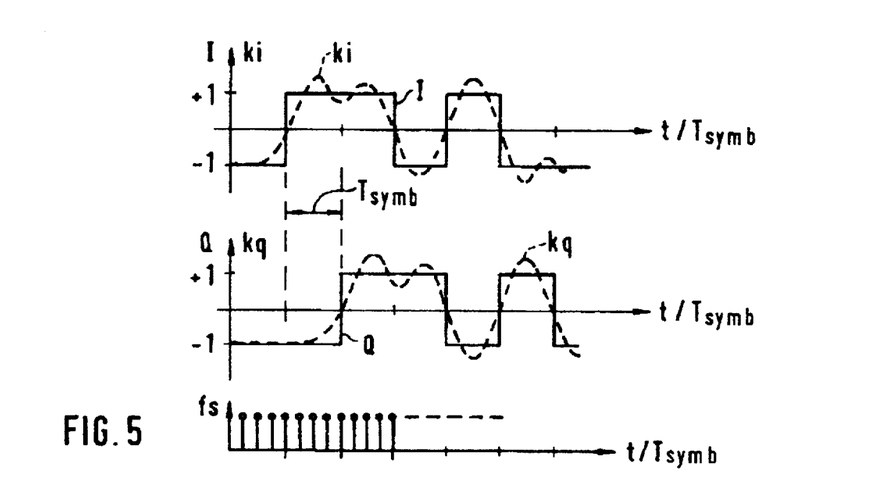
FIG. 5 shows a pair of signals in quadrature and an advantageous sampling clock.

FIG. 5 shows examples of idealized waveforms of the I and Q signals in the transmitter and receiver, which, according to the associated symbols Si, theoretically would have to have infinitely steep pulse edges between the normalized signal values ±1 and −1, i.e., the spectrum would then be infinitely long. To reduce the necessary bandwidth as far as possible, the edges are rounded in a predetermined manner by means of the aforementioned pulse-shaping filters, whereby the in-phase component ki and the quadrature component kq are formed from the pulse sequence. The illustrated components ki, kq occur both in the transmitter and, in slightly modified form, in the receiver, and can be digitized there before or after the quadrature mixing by a sampling clock fs. How far the sampling frequency can be reduced is apparent from FIG. 6.

Figure 6:
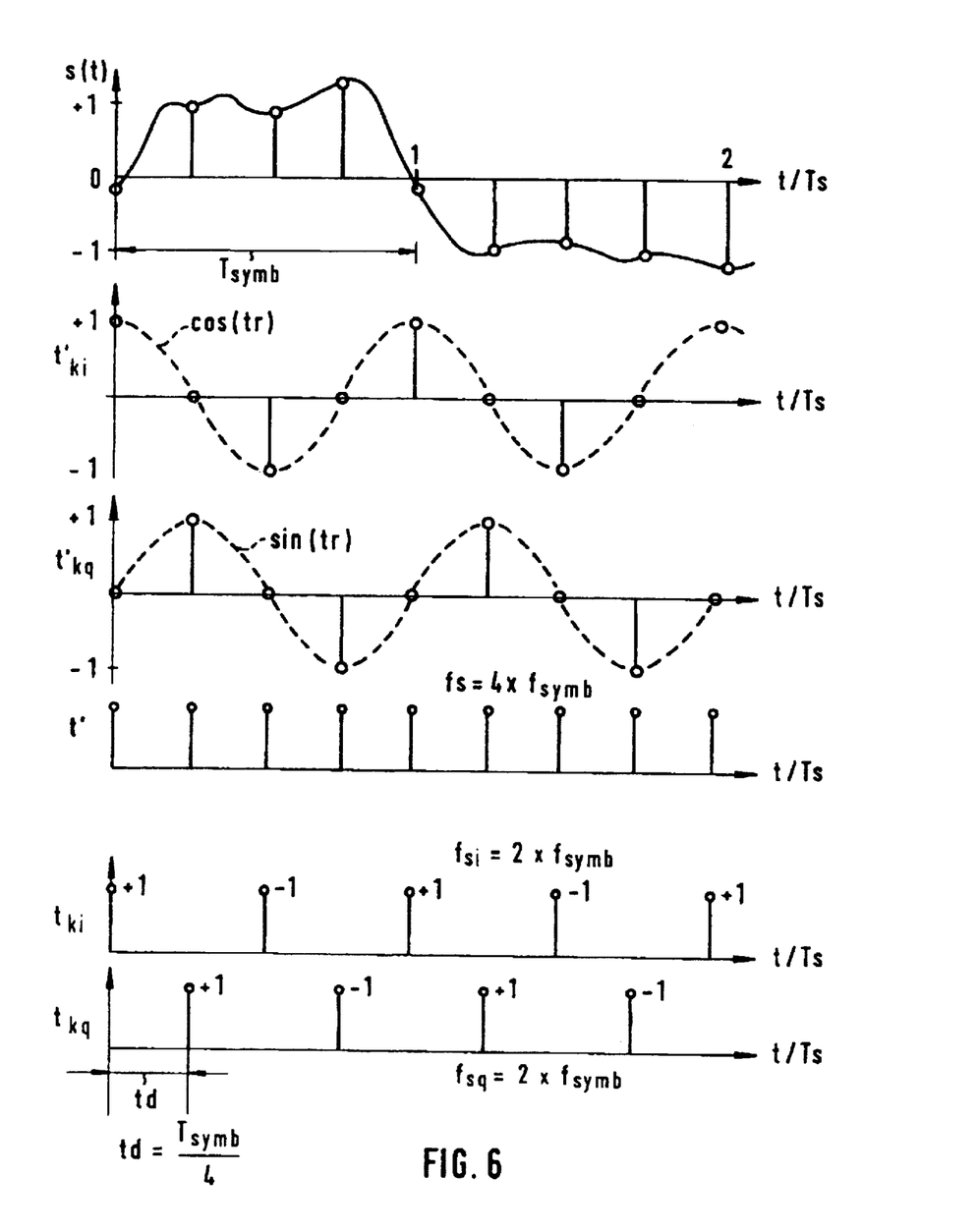
FIG. 6 illustrates schematically the digital signal processing in the receiver.

FIG. 6 shows schematically how the individual quadrature signal components ki, kq can be recovered in the receiver R from the received analog signal s(t) by suitable sampling. It shows the analog signal s(t) and the associated cos and sin components cos(tr), sin(tr) of the carrier tr (dashed curves) on the same time scale. The time axis t is normalized to the symbol period $T_{symb}$ (=$T_s$=Ts). The fourth line shows the sampling instants t' of the sampling clock fs, which are locked to the I/Q coordinate crossings of the reference phase as shown in FIG. 4, thus also determining the carrier-related sampling instants $t'_{ki}$ and $t'_{kq}$ of the cos and sin carrier components, respectively. This results in an advantageous sampling rate fs and an advantageous carrier frequency $f_{tr}$, which are integrally related to the symbol frequency fsymb: fs=4×$f_{symb}$ and $f_{tr}$=$f_{symb}$. Then, as stated above, very simple multiplication factors are obtained for the quadrature mixing in the receiver, namely only the values +1, 0 and −1. The mixers can be very easily implemented in digital and analog form with gates and negators.

If sampling takes place at the time of the respective I/Q coordinate crossing, the quadrature mixing in the receiver can be further simplified, since multiplication by the factor "0" gives the signal value "0". This "0" signal value can be simply omitted for the further processing, as is commonly done in simple sampling-rate-reducing stages, which are also referred to as decimation stages, by omitting individual data and subsequent low-pass filtering. In the case of quadrature-modulated signals, the omission does not result in an information loss.

The last two lines show the sampling clocks fsi and fsq, coupled with the multiplication factors +1 and −1, at the sampling instants $t_{ki}$ and $t_{kq}$ for the in-phase component ki and the quadrature component kq, respectively. The sampling instants $t_{ki}$ and $t_{kq}$ are separated by the time interval td, with td=¼×$T_{symb}$.

The frequency of the in-phase sampling clock fsi and the frequency of the quadrature sampling clock fsq are thus identical:

fsi=fsq=2×fsymb, but the phases are different, so that the sample values $t_{ki}$ and $t_{kq}$ are separated in time by Tsymb/4, as stated above.

The instantaneous position φ(t) of the resulting vector tr(t), and thus the two quadrature components ki, kq, can be determined with the required precision only if both an in-phase sample value and a quadrature sample value are actually available at the respective sampling instant t. In the case of the alternating sampling sequences $t_{ki}$, $t_{kq}$ of FIG. 6, this is not possible without interpolation.

Commonly used FIR interpolation filters, which must also satisfy the Nyquist and noise-matching criteria, require bulky circuitry, but so far cannot be avoided. According to the invention, however, a considerably simpler IIR filter is proposed which also satisfies the above criteria. A prerequisite is that one of the two quadrature signal components ki, kq is delayed in the transmitter by a time interval td which is preferably equal to one quarter of the symbol period Tsymb.

Figure 7:
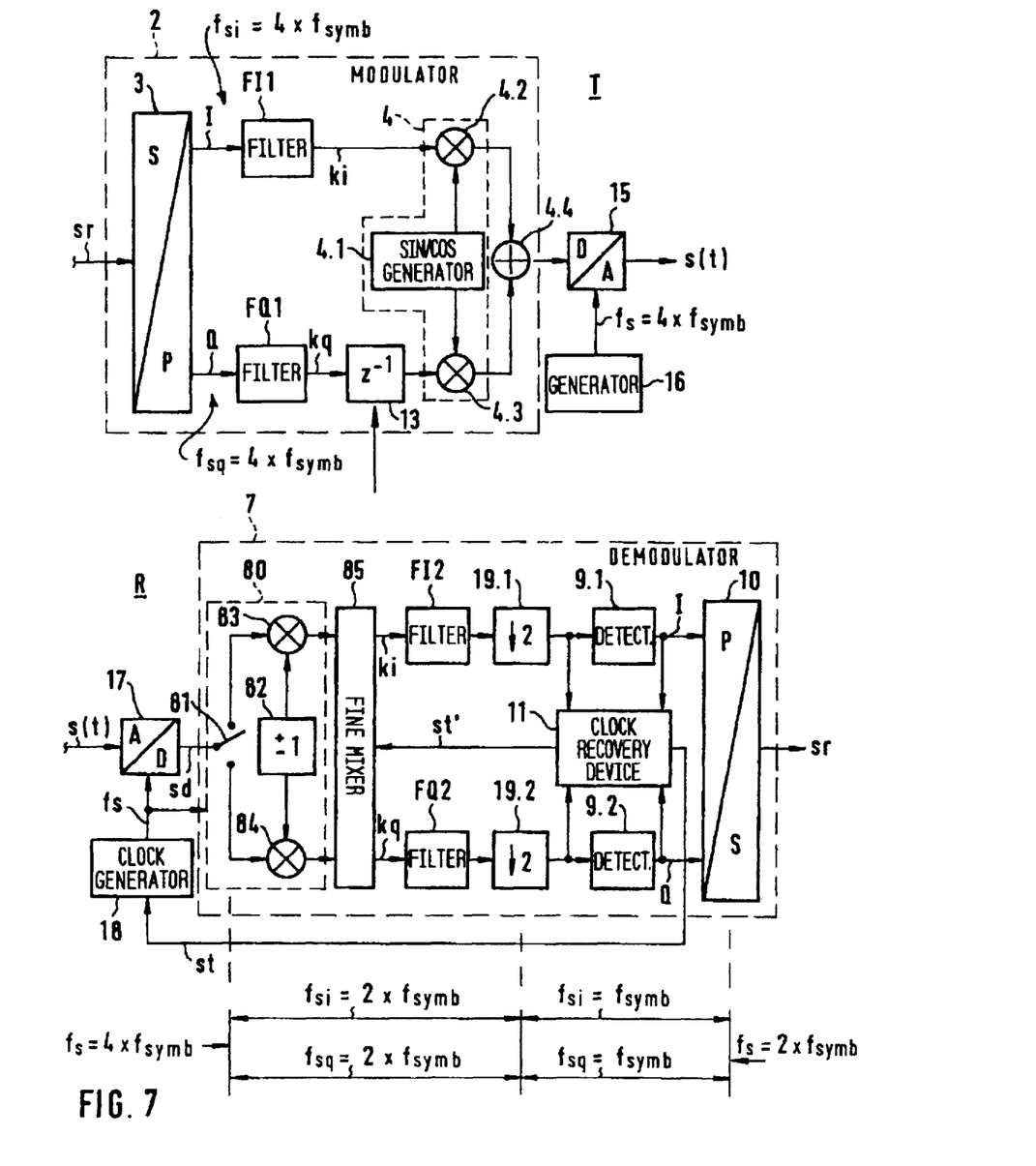
FIG. 7 shows a transmitter and a receiver according to the invention.

FIG. 7 shows an embodiment of the transmitter T and receiver R according to the invention. The transmitter T contains the same functional units as in the block diagram of FIG. 1 except for a delay element 13 in the quadrature-component path Q. As the same reference characters are used and the operation is basically the same as in FIG. 1, the overall transmitter circuit T need not be explained again. The delay interval td introduced by the delay element 13 has the value td=Tsymb/4. With this value, as stated above, complex pulse-shaping filters can be replaced at the receiver end R by very simple filter structures. This, of course, has a repercussion on the implementation and design of the pulse-shaping filters FI1, FQ1 in the transmitter, as will be explained in detail below. The signal processing in the transmitter T can be analog or digital. If the processing is digital, the frequencies of the processing clocks fsi, fsq should be at least four times the symbol frequency or multiples thereof.

FIG. 7 shows a digital embodiment of the transmitter T. The digital modulator 2 is followed by a digital-to-analog converter 15, which is fed with a conversion clock rate fs equal to four time the symbol rate, fs=4×fsymb, from a generator 16, which is locked (not shown in FIG. 7) to the bit clock $f_{Bit}$ of the data stream sr. Through this converter 15, whose output is the analog signal s(t), it once again becomes clear that the transmission proper is a analog. The radio-frequency conversion at the transmitter and receiver ends is not shown.

The block diagram of the receiver R of FIG. 7 shows a basic construction very similar to that of the receiver of FIG. 1. Like functional units have been designated by like reference characters, so that correspondences are easily recognizable. Again, reference is made to the preceding description. The received and down-converted analog signal s(t) is digitized by means of an analog-to-digital converter 17 and forms a data stream sd. The digitization clock fs comes from a clock generator 18 coupled to a clock recovery device 11. In a conventional digital processing arrangement, the digitization clock would be arbitrary provided that the sampling theorem is not violated with respect to the bandwidth of the received signal s(t). For the preferred digital receiver implementation, however, the digitization clock fs is not freely predeterminable, but its frequency should be, as exactly as possible, four times the symbol frequency fsymb. This follows from the discussion of FIG. 6 and the explanations of the filter realization if a switched receiver quadrature mixer with the simple switching behavior +1, −1 is to be used. This gives sampling frequencies fsi, fsq for the in-phase and quadrature components ki, kq with fs=2× fsymb. This is a prerequisite for the implementation of the receiver filter with IIR filter structures, cf. the pertinent description below, particularly Equation (2). A quadrature mixer 80, 85 in a demodulator 7 works on this principle.

The quadrature mixer 80, which is coupled to the clock generator 18, has an electronic switch 81 associated with it as a demultiplexer which distributes the output data of the analog-to-digital converter 17 alternately to an I data path and a Q data path. The electronic switch 81 corresponds to the reversal of the adder 4.4 in the transmitter T of FIG. 7. A generator 82 for the quadrature carrier tr, which is connected to an I mixer 83 and a Q mixer 84, contains a data source 82 which alternately provides the values +1 and −1 to the mixers 83, 84. The latter must either leave the applied data unchanged or negate them; both can be easily implemented with the usual binary number systems, particularly in the two's complement representation. In addition to the mixer 80, which is a coarse quadrature mixer, the demodulator 7 includes a fine quadrature mixer 85, which processes only very low carrier difference frequencies. Thus, the in-phase and quadrature components ki, kq are multiplied after the coarse mixer 80 by slowly varying cos and sin values, respectively, which corresponds to an additional angular rotation of the resulting carrier or vector tr. Because of this division, the adjustment of the relatively high carrier frequency in the fast mixer 80 can be performed in relatively coarse frequency steps without resulting in any inaccuracies during evaluation. The coarse and fine quadrature mixers 80 and 85 are controlled by control signals st and st', respectively, from the clock recovery device 11.

The two quadrature mixers 80, 85 are followed by an in-phase pulse-shaping filter FI2 in the I data path and a quadrature pulse-shaping filter FQ2 in the Q data path. The pulse-shaping filters FI2 and FQ2 are followed by decimation stages 19.1 and 19.2, respectively, in which the respective data rates fsi, fsq are again reduced by a factor of ½. Finally, two detector stages 9.1, 9.2 recover the original symbols Si, which are recombined into a serial data stream sr by a parallel-to-serial converter 10. In FIG. 7, the respective sampling rates have been entered for the respective processing sections of the transmitter T and receiver R for the sake of clarity.

The block diagram of the receiver R of FIG. 7 does not include any delay elements, which were to be expected because of the delay in the transmitter T. This is due to the inventive implementation of the pulse-shaping receiver filters FI2, FQ2 using IIR filter structures with two all-pass networks each. These filters, in conjunction with the corresponding transmitter filters FI1, FQ1, satisfy both the noise-matching criterion and the Nyquist criterion. In the following part of the description, the proof of these properties, the corresponding filter structures, and their basic design are described in detail by the example of a pair of filters F1, F2 which can substitute for the in-phase filter pair FI1, FI2 or the quadrature filter pair FQ1, FQ2. These filters F1, F2 have different filter structures. The transfer characteristics of the individual filters are asymmetric. As will be shown, however, the impulse responses of the two filters F1, F2 must be mirror-symmetric with respect to each other.

Figure 8:
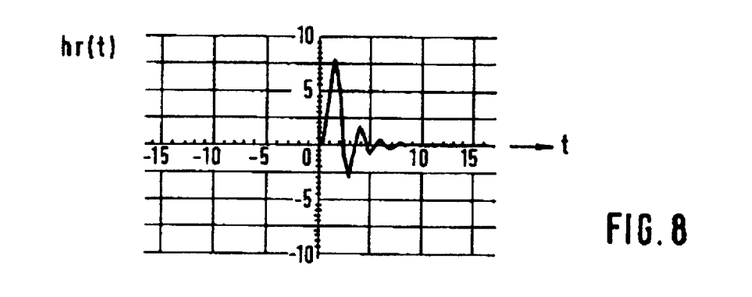
FIG. 8 shows the transfer function of the receiver filter.
Figure 9:
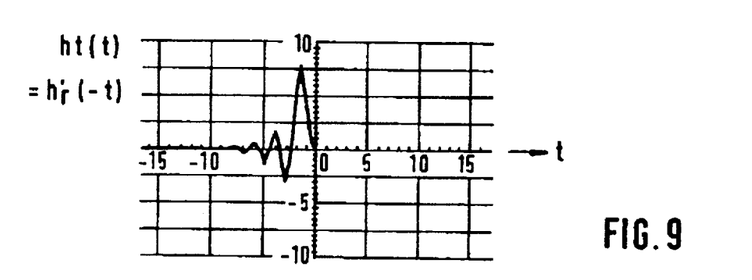
FIG. 9 shows the transfer function of the transmitter filter.
Figure 10:
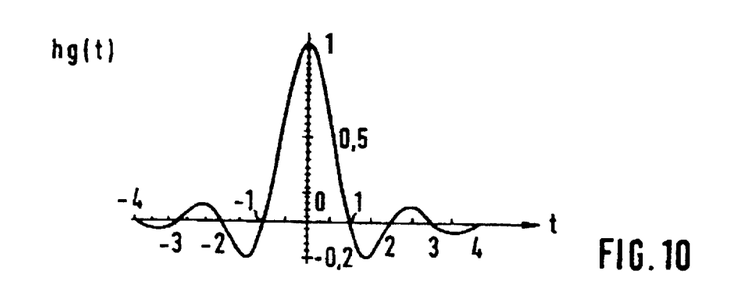
FIG. 10 shows the convoluted transfer function of the transmitter and receiver filters.

The following remarks relate to the two asymmetric filter pairs FI1, FI2 and FQ1, FQ2. For the invention, an asymmetric filter combination F1, F2 must be implemented. Examples of the impulse response h(t) of an asymmetric filter combination F1, F2 are given in FIG. 9 for the transmitter filter F1 and in FIG. 8 for the receiver filter F2. The two waveforms are mirror-symmetric with respect to the time axis t=0. The impulse response of FIG. 9, which extends into the negative time range, can be implemented by suitably predelaying the impulse response of FIG. 9 and/or the impulse response of FIG. 8 without violating the law of causality. The interaction of the two asymmetric filters F1, F2 is represented in FIG. 10 by the common impulse response hg(t), which is obtained by convolution of the impulse responses of FIGS. 8 and 9.

For the further considerations it is necessary to discuss the Nyquist criterion and the noise-matching criterion in more detail by examining the complex transfer functions H(z). In the following formulas, indexing in the usual form is used only if otherwise misunderstandings could result. The filter combination F1, F2 has a common transfer function Hg(z) which is divided into a transfer function Ht(z) for the transmitter filter F1 and a transfer function Hr(z) for the receiver filter F2. Convolution of the transfer functions of the two filters F1, F2 gives the transfer function Hg(z) for the filter combination F1, F2:

$$Hg(z)=Ht(z)\times Hr(z) \qquad \text{Eq. (1)}$$

The following considerations apply on condition that the sampling clock fsi, fsq for the receiver filter F2, which is determined in FIG. 7 by the analog-to-digital converter 17 and the demultiplexer 81, is twice as high as the symbol frequency fsymb, i.e., fsi=fsq=2×fsymb. For the sake of simplicity, a distinction is made in the following between the in-phase sampling clock fsi and the quadrature sampling clock fsq for the receiver filter F2 only in case of doubt; instead, the sampling clock or sampling frequency fs assigned to the respective processing section will be given for fsi and fsq.

Assuming that $$fs=2\times fsymb, \qquad \text{Eq. (2)}$$

the implementation of the pulse-shaping filters in the receiver and the formulation of the criteria to be satisfied becomes particularly simple. The Nyquist criterion then has the following general form:

$$Hg(z)+Hg(-z^*)=1 \qquad \text{Eq. (3)}$$

where $$z=\text{Exp }(j\times 2\pi\times f/f_s).$$

For optimum noise matching, the following relation must hold between the transmitter filter F1 and the receiver filter F2:

$$Ht(z)=Hr(z^*) \qquad \text{Eq. (4)}$$

Furthermore, to suppress adjacent-channel interference, a sufficient attenuation $a_{min}$ is required in the respective stopband of F1, F2. The beginning of the stopband is commonly defined with the aid of the roll-off factor r:

$$|Ht(\text{Exp}(j\times 2\pi\times f/f_s))|\leq a_{min} \text{ for } f\geq 0.5\times fsymb\times(1+r) \qquad \text{Eq. (5)}$$

$$|Hr(\text{Exp}(j\times 2\pi\times f/f_s))|\leq a_{min} \text{ for } f\geq 0.5\times fsymb\times(1+r) \qquad \text{Eq. (6)}$$

These conditions, as stated above, are satisfied by "raised-cosine" and Gaussian filters, which are widely used as pulse-shaping filters. A disadvantage of these filter structures, however, is the considerable amount of circuitry required at the transmitter and receiver ends.

The invention is predicated on recognition that a receiver-filter structure with two parallel-connected all-pass networks A1, A2 can also satisfy the criterion of Equations (2), (3), (5), and (6). The associated complex transfer function has the form $$Hr(z)=\tfrac{1}{2}\times(A1(z^2)+z^{-1}\times A2(z^2)) \qquad \text{Eq. (7)}$$

The complex transfer function of the two all-pass filters A1, A2 has the form $$H_{all\text{-}pass}(z)=A_i(z)=(a_m+a_{m-1}\times z^{-1}+\ldots+a_1\times z^{-m+1}+z^{-m})/(1+a_1\times z^{-1}+\ldots+a_m\times z^{-m}) \qquad \text{Eq. (8)}$$

If Equation (8) is referred to the inverted variable $z^*=1/z$ rather than the variable z, the following transformation results:

$$A_i(z^*)=1/A_i(z) \qquad \text{Eq. (8A)}$$

As can be shown, a filter combination F1, F2 which is implemented using all-pass networks both in the receiver filter F2 and in the corresponding transmitter filter F1 theoretically satisfies the Nyquist condition.

Starting from Equation (7), the transfer function Ht(z) of the transmitter filter F1 is formed from the transfer function Hr(z) of the receiver filter F2 via the noise-matching condition of Equation (4):

$$Ht(z)=\tfrac{1}{2}\times(1/A1\ (z^2)+z/A2(z^2)) \qquad \text{Eq. (8b)}$$

The common transfer function Hg(z) of this filter combination F1, F2 using all-pass networks results from the convolution of the individual transfer functions according to Equation (7) and Equation (8b):

$$Hg(z)=\tfrac{1}{2}\times(A1(z^2)+z^{-1}\times A2(z^2))\times\tfrac{1}{2}\times(1/A1(z^2)+z/A2(z^2)) \qquad \text{Eq. (9)}$$

The convolution, to be performed via a complex multiplication of the two transfer functions Hr(z) and Ht(z), yields the following equation:

$$Hg(z)=\tfrac{1}{2}+\tfrac{1}{4}\times(z\times A1(z^2)/A2(z^2)+z^{-1}\times A2(z^2)/A1(z^2)) \qquad \text{Eq. (10)}$$

Applying the Nyquist criterion from Equation (3) formally to Equation (10), which involves in particular forming the transfer function Hg(−z*), gives $$Hg(z)+Hg(-z^*)=1+0 \qquad \text{Eq. (11)}$$

Although Equation (11) is derived via the transfer function of filters with all-pass networks, it looks the same as Equation (3), the general form of the Nyquist criterion. Unfortunately the conjugate-complex filter according to Equation (4) is unstable and is not causally realizable in this form using all-pass networks. Through the inversion of the receiver filter F2, which is assumed to be stable, poles and zeros are interchanged, whereby the poles of the transmitter filter F1 are moved to the complex frequency domain outside the unit circle. This, however, applies only to a mathematically exact IIR implementation of the transmitter filter. By an FIR approximation, however, it is readily possible to design a transmitter filter which satisfies the required conditions with an accuracy limited only by the amount of filter circuitry required. The design of this filter, as mentioned above, is based on the mirrored and delayed impulse response hr'(−t)=ht(t) of the receiver filter F2 according to FIGS. 8 and 9.

Figure 11:
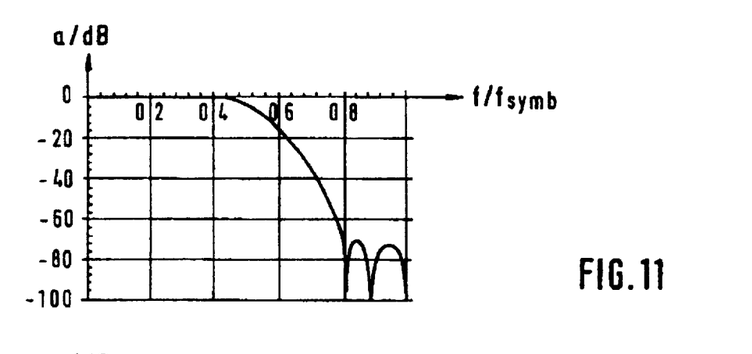
FIG. 11 shows the attenuation characteristic of the receiver filter and of an associated ideal transmitter filter.

FIG. 11 shows, by way of example, the attenuation characteristic of a receiver filter F2 using all-pass networks. The frequency f has been normalized to the symbol frequency fsymb. In the stopband, the attenuation a is approximately −70 dB. The conjugate-complex receiver filter, cf. Equation (8b), theoretically has to have the same attenuation characteristic. However, since, as stated above, an all-pass implementation is not possible there, an FIR filter structure with which the frequency response to be mirrored, hr(t), is approximated as closely as possible by the frequency response ht(t) of FIG. 9 is used for the transmitter filter F1. The impulse response, which theoretically extends infinitely into the negative time range, must be replaced by a time window which defines the beginning of the impulse response. This is fully justified if the clipped impulse response represents only an insignificant contribution. If necessary, the time window and the associated FIR filter structure must be further enlarged until the suppressed contribution becomes negligible. An estimate shows that with the invention, the amount of circuitry required in the hitherto used FIR filters F1 needs to be increased by only 10 to 20%. At the receiver end, however, the saving is dramatic, since the comparable amount of filter circuitry required there is reduced, for example, by a factor of 10. In addition, the receiver filters FI2, FQ2 are identical.

Figure 12:
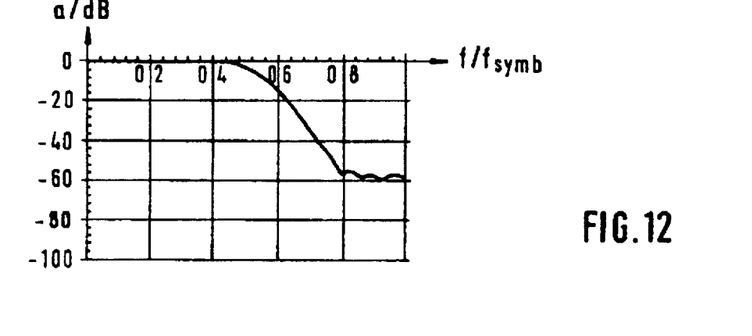
FIG. 12 shows the attenuation characteristic of the real transmitter filter.

The influence of the FIR filter, which represents an approximation, on the signal transmission properties manifests itself essentially only in the stopband attenuation, which is approximately −55 dB in the example assumed in FIG. 12. The total attenuation of the filter combination F1, F2 provides a total stopband attenuation which is more than sufficient for the desired attenuation characteristic.

Figure 13:
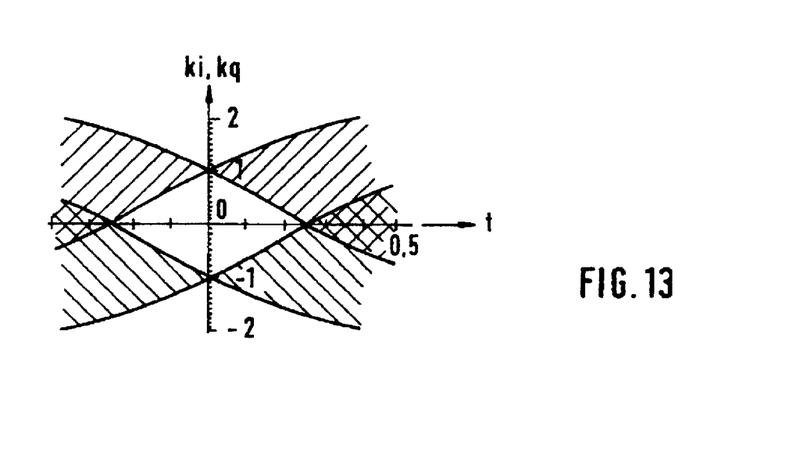
FIG. 13 shows the limit curves of the demodulated quadrature signal components in the receiver in a schematic eye diagram.

FIG. 13 shows receive-side in-phase and quadrature components ki, kq schematically in an eye diagram. The curves passing through the signal values ki, kq=+1 and ki, kq=−1 represent limit curves between which the receive-side quadrature signal components may be located, regardless of whether a symbol transition is just occurring or not. Since these limit curves intersect exactly at the values +1 and −1, it is apparent that the sequence of preceding symbols may be arbitrary and has no effect whatsoever on the symbol states Si to be determined at the instant t=0. The eye diagram of FIG. 13, which represents in analog form the two quadrature signal components ki, kq at all possible transitions between the instants $-0.5 \leq t/T_s \leq +0.5$, is determined by computation from an asymmetric filter combination F1, F2 whose attenuation characteristic corresponds to FIGS. 11 and 12.

Figure 14:
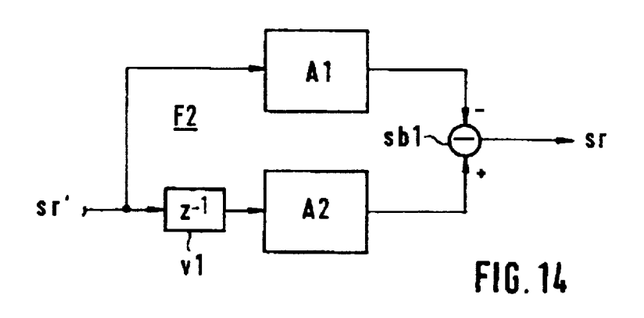
FIG. 14 shows an IIR filter structure.

FIG. 14 shows the structure of the receiver filter F2 with two all-pass networks A1, A2 in a block diagram. The structure shows a first signal path with the all-pass network A1 and a second signal path with a series combination of a $z^{-1}$ delay element v1 and the second all-pass network A2. The common input of the two signal paths is fed with a digital input signal sr'. The outputs of the first and second all-pass networks A1 and A2 are connected, respectively, to the subtrahend input and the minuend input of a subtracter sb1, which delivers the digital output signal sr of the receiver filter F2.

Figure 15:
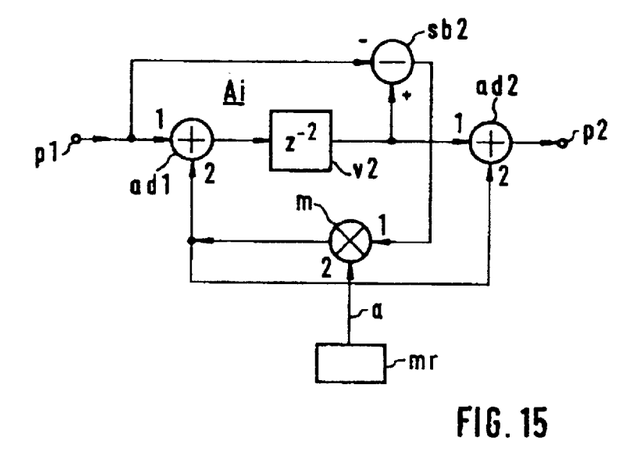
FIG. 15 shows an all-pass structure.

FIG. 15 shows the functional units and the structure of an all-pass filter Ai suitable for the invention in a block diagram. The all-pass filter is a second-order filter, which represents the simplest embodiment of an all-pass filter according to Equation (8) with m=2. An input p1 is connected to the first input 1 of a first adder ad1 and to the subtrahend input of a subtracter sb2. The output of the adder ad1 is coupled to a $z^{-2}$ delay element v2 whose output is connected to the minuend input of the subtracter sb2 and to the first input 1 of a second adder ad2. Connected to the output of the subtracter sb2 is the first input 1 of a multiplier m, whose second input 2 is fed with a factor a from a memory device mr. With the factor a, the filter characteristics of the all-pass filter Ai are determined. The output of the multiplier m is connected both to a second input 2 of the first adder ad1 and to a second input 2 of the second adder ad2, whose output is connected to an output p2. The filter structure is thus very simple and can be easily implemented in digital form. It should be noted that the all-pass structure of FIG. 15 includes only a single multiplier m. By contrast, conventional FIR structures for the receiver filter F2 include a plurality of multipliers with which individual weights are assigned to the stored signals. As many as 40 sample values may have to be weighted, and thus multiplied. The advantage of a receiver implementation using all-pass filters is readily apparent from this comparison. With higher-order all-pass filters which are designed according to Equation (8), the filter characteristics can be improved at a correspondingly higher cost, which, however, is still well below the cost of comparable FIR filters. The receiver filter F2 or the transmitter filter F1 need not necessarily be implemented in digital form, but the inventive concept can also be applied in principle to analog filter structures.

We claim:

1. A transmission system for a digital signal (sr) which, encoded in symbols (Si), is transmitted from a transmitter (T) to a receiver (R) by quadrature modulation, wherein:

said transmitter comprises means for delaying one of the two quadrature signal components (ki, kq) before the quadrature modulation by a given time interval (td) substantially equal to one quarter of a symbol period $T_{symb}$ or by one quarter of the period of the quadrature carrier (tr) in the transmitter (T); and, said receiver (R) comprises:

clock recovery means;

an analog-to-digital converter coupled to said clock recovery means;

said analog-to-digital converter for forming a sampled signal (sd) from a received signal (s(t)), and utilizing a sampling frequency fs being substantially equal to four times the symbol frequency $f_{symb}$;

a demultiplexer coupled to said clock recovery means; said demultiplexor for separating the sampled signal (sd) into an in-phase component (ki) for an I data path (I) and a quadrature component (kq) for a Q data path (Q) which are each filtered by means of a respective pulse-shaping filter (FI2, FQ2) with an IIR filter structure; and a quadrature mixer coupled to said clock recovery means.

2. The transmission system of claim 1, wherein said transmitter (T) further comprises:

a serial-to-parallel converter which converts the digital signal (sr), which is provided by a data source and is locked to a bit rate $f_{Bit}$, into an I data stream (I) and a Q data stream (Q);

a first in-phase filter (FI1) and a first quadrature filter (FQ1), each serving as a pulse-shaping filter, for limiting the bandwidth of the I and Q data streams (I,Q) to form an in-phase component (ki) and a quadrature component (kq) which modulate a quadrature carrier (tr) by means of a transmitter quadrature mixer; and a delay element which is connected ahead of the transmitter quadrature mixer and delays either the in-phase component (ki) or the quadrature component (kq) by a time interval (td) substantially equal to ¼ of the symbol period $T_{symb}$.

3. The transmission system of claim 1, wherein:

after the receiver quadrature mixer, the in-phase component (ki) and the quadrature component (kq) are filtered by means of a second in-phase filter (FI2) and a second quadrature filter (FQ2), respectively, which are each implemented using an IIR filter structure;

the transfer function Hr(z) of the second in-phase and quadrature filters (FI2, FQ2) results from the interaction of an associated first in-phase filter (FI1) and an associated first quadrature filter (FQ1) in the transmitter (T), which are preferably implemented in digital form using an FIR structure; and the combination of the first and second in-phase filters (FI1, FI2) and the combination of the first and second quadrature filters (FQ1, FQ2) each have a transfer function Hg(z)=Ht(z)×Hr(z), which satisfies both the Nyquist criterion Hg(z)+Hr(−z*)=1 and the noise-matching criterion (Ht(z)=Hr(z*).

4. The transmission system of claim 3, wherein the second in-phase filter (FI2) and the second quadrature filter (FQ2) each include a first all-pass network (A1) and a second all-pass network (A2), with the transfer function $H_t(z)$ being defined by the relationship $H_t(z)=A_t(z)=(a_m+a_{m-1}\times z^{-1}+ \ldots +a_1\times z^{-m+1}+z^{-1})/(1+a_1\times z^{-1}+ \ldots +a_m\times z^{-m})$ and the transfer function Hr(z) of the second in-phase filter (FI2) and the second quadrature filter (FQ2) being defined by the relationship $Hr(z)=(A_1(z^2)+z^{-1}\times A_2(z^2))/2$.

5. The transmission system of claim 3, wherein the transfer function $H_t(z)$ of the first in-phase filter (FI1) or the first quadrature filter (FQ2) is determined from the transfer function $H_r(z)$ of the second in-phase filter (FI2) or second quadrature filter (FQ2), respectively, particularly via the symmetry condition of the noise-matching criterion $H_t(z)=H_r(z*)$ with respect to the impulse responses $h_t(t)$, $h_r(t)$ of the first and second in-phase filters (FI1, FI2) or the first and second quadrature filters (FQ1, FQ2), respectively, and that the resulting impulse response $(h_t(z)$ of the first in-phase filter (FI1) or the first quadrature filter (FQ1) is approximated with arbitrary accuracy by the FIR structure.

6. The transmission system of claim 4, wherein the second in-phase filter (FI2) and the second quadrature filter (FQ2) have two parallel signal paths which are connected together at the input end, and which are connected together at the output end by means of an adder/subtracter (sb1), with the subtrahend path containing the first all-pass network (A1), and the minuend path containing a series combination of a $z^{-1}$ delay element (v1) and the second all-pass network (A2).

7. The transmission system of claim 4, wherein the first and second all-pass networks (A1, A2) each represent a first-order all-pass structure $A_t(z^2)$, and that said all-pass structure contains a $z^{-2}$ delay element (v2), a multiplier (m), a first adder (ad1), a second adder (ad2), and a second subtracter (sb2) as functional units.

8. The transmission system of claim 7, wherein in said receiver (R) the functional units in the all-pass structure $A_t(z^2)$ are interconnected as follows:

a series combination between an input (p1) and an output (p2) contains, in the direction of signal flow, the first adder (ad1), which is connected to the first input (p1), as well as the $z^{-2}$ delay element (v2) and the second adder (ad2), which is connected to the output (p2);

the second subtracter (sb2) is connected to the input terminal (p1) via its subtrahend input, to the output of the $Z^{-2}$ delay element (v2) via its minuend input, and to the first input of the multiplier (m) via its output; and the second input of the multiplier (m) is fed with a filter factor a from a memory (mr), and the output of the multiplier (m) is connected both to the second input of the first adder (ad1) and to the second input of the second adder (ad2).

9. The transmission system of claim 1, wherein a filter combination comprises at the transmitter end a first in-phase filter (FI1) and a first quadrature filter (FQ1), each with an FIR filter structure, and at the receiver end a second in-phase filter (FI2) and a second quadrature filter (FQ2), each with an IIR structure;

the second in-phase filter (FI2) and the second quadrature filter (FQ2) are implemented with a $Z^{-1}$ delay element (v1), a first all-pass network (A1), and a second all-pass network (A2) according to the transfer function $H_r(z) =(A1(z^2)+z^{-1}\times A2(z^2))/2$, the transfer function $A_t(z)$ of the first and second all-pass networks (A1, A2) being defined by the relationship $H_{all-pass(Z)}=A_t(z)=(a_m+a_{m-1}\times z^{-1}+ \ldots +a_1\times z^{-m+1}+z^{-m})/(1+a_1\times z^{-1+} \cdots {+}a_m\times z^{-m})$;

an impulse response convoluted in the time domain, $h_r'(-t)$, is formed via the impulse response $h_r(t)$ of the second in-phase filter (FI2) and the second quadrature filter (FQ2) according to the noise-matching criterion $H_r(z*)$, said impulse response $h_r(t)$ being previously bounded in the time domain in the range of slight residual oscillations, particularly in the range of oscillations which are dying out; and from the mirrored and bounded impulse response $h_r'(-t) =_t h(t)$, the coefficients ($a_0$ to $a_n$) of an FIR filter are determined which is used in the filter combination (F1, F2) as the first in-phase filter (FI1) and the first quadrature filter (FQ1).

10. A receiver (R) for receiving a digital signal (sr) which, encoded in symbols (Si), is transmitted from a transmitter (T), said transmitter (T) comprising means for delaying one of the two quadrature signal components (ki, kq) before quadrature modulation, said receiver comprising:

clock recovery means;

an analog-to-digital converter coupled to said clock recovery means; said analog-to-digital converter for forming a sampled signal (sd) from a received signal (s(t)), and utilizing a sampling frequency fs being substantially equal to four times the symbol frequency $f_{symb}$;

a demultiplexor coupled to said clock recovery means; said demultiplexor for separating the sampled signal (sd) into an in-phase component (ki) for an I data path (I) and a quadrature component (kq) for a Q data path (Q) which are each filtered by means of a respective pulse-shaping filter (FI2, FQ2) with an IIR filter structure; and a quadrature mixer coupled to said clock recovery means.

* * * * *